United States Patent [19]
Sano

[11] Patent Number: 6,043,297
[45] Date of Patent: Mar. 28, 2000

[54] PIGMENT-BASED INK COMPOSITION HAVING EXCELLENT LIGHTFASTNESS

[75] Inventor: Tsuyoshi Sano, Nagano, Japan

[73] Assignee: Seiko Epson Corporation, Tokyo, Japan

[21] Appl. No.: 09/172,102

[22] Filed: Oct. 9, 1998

[30] Foreign Application Priority Data

Oct. 13, 1997 [JP] Japan ..................................... 9-278623

[51] Int. Cl.⁷ ........................ C09D 11/10; C09D 125/08; C09D 133/02; C08F 212/08; C08F 220/06; C08K 5/23; C08L 33/02; C08L 25/08
[52] U.S. Cl. ........................ 523/160; 524/190; 524/556; 526/318.6; 106/31.65
[58] Field of Search ..................... 523/160, 161; 106/31.6, 31.65, 31.75; 524/190, 556, 505; 525/250, 271, 301; 526/318.6, 173

[56] References Cited

U.S. PATENT DOCUMENTS

| | | | |
|---|---|---|---|
| 5,085,698 | 2/1992 | Ma et al. | 524/338 |
| 5,160,372 | 11/1992 | Matrick | 106/31.43 |
| 5,172,133 | 12/1992 | Suga et al. | 347/100 |
| 5,417,747 | 5/1995 | Arata et al. | 106/31.68 |
| 5,549,740 | 8/1996 | Takahashi et al. | 106/31.43 |
| 5,690,723 | 11/1997 | Sano et al. | 106/31.75 |
| 5,738,716 | 4/1998 | Santilli et al. | 106/31.77 |
| 5,760,124 | 6/1998 | Listigovers et al. | 524/505 |
| 5,846,306 | 12/1998 | Kubota et al. | 106/31.75 |
| 5,849,815 | 12/1998 | Aoki et al. | 523/161 |

FOREIGN PATENT DOCUMENTS

| | | |
|---|---|---|
| 0550891A | 7/1993 | European Pat. Off. . |
| 0607911A | 7/1994 | European Pat. Off. . |
| 0658607A | 6/1995 | European Pat. Off. . |

*Primary Examiner*—Vasu Jagannathan
*Assistant Examiner*—Callie E. Shosho
*Attorney, Agent, or Firm*—Ladas & Parry

[57] ABSTRACT

A yellow ink composition comprising C.I. Pigment Yellow 74 is provided which possesses excellent properties, especially excellent lightfastness. The yellow ink composition comprises a pigment C.I. Pigment Yellow 74 and a styrene-(meth)acrylic acid-based, water-soluble resin in an amount of not less than 0.4 part by weight in terms of solid content based on the pigment.

13 Claims, No Drawings

6,043,297

PIGMENT-BASED INK COMPOSITION HAVING EXCELLENT LIGHTFASTNESS

BACKGROUND OF THE INVENTION

1. Field of the Invention

The present invention relates to a pigment-based yellow ink composition, particularly a yellow ink composition suitable for ink jet recording.

2. Background Art

Ink jet recording is a printing method wherein droplets of an ink composition are ejected and deposited onto a recording medium, such as paper, to conduct printing. This method has a feature that an image having high resolution and quality can be printed at a high speed by means of a relatively inexpensive apparatus. In general, the ink composition used in the ink jet recording comprises water as a main component and, added thereto, a colorant and a wetting agent, such as glycerin, for preventing clogging and other purposes. Water-soluble dyes, by virtue of high chroma of the colorant, abundance in types of usable colorants, solubility in water and other advantageous properties, have been extensively used as the colorant in the ink composition for ink jet recording. The dyes, however, are essentially soluble in water, and hence are often poor in waterfastness and other various properties.

Pigments, as compared with the dyes, have superior waterfastness. This has recently led to studies on utilization of pigments as a colorant in the ink composition for ink jet recording from the viewpoint of improving the waterfastness of the printed image. However, among various pigments, only limited pigments can exhibit color reproduction and other properties comparable to dyes. For yellow pigments, use of C.I. Pigment Yellow 74 can be expected by virtue of high color reproduction.

C.I. Pigment Yellow 74, however, often has poor lightfastness that is a disadvantageous property commonly observed in yellow pigments, and, hence, techniques for improving the lightfastness of this pigment have been desired in the art.

SUMMARY OF THE INVENTION

The present inventors have now found that the lightfastness and other properties of the ink composition containing C.I. Pigment Yellow 74 can be improved by adding a specific resin to the ink composition. The present invention has been made based on such finding.

Accordingly, an object of the present invention is to provide an ink composition comprising C.I. Pigment Yellow 74 that has excellent properties.

The yellow ink composition according to the present invention comprises: C.I. Pigment Yellow 74 as a colorant; and a styrene-(meth)acrylic acid-based, water-soluble resin, the content of the resin being not less than 0.4 part by weight in terms of solid content based on the colorant.

DETAILED DESCRIPTION OF THE INVENTION

The yellow ink composition according to the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink jet recording method.

Basically, the yellow ink composition according to the present invention comprises a colorant and a water-soluble resin, wherein the colorant is C.I. Pigment Yellow 74 while the water-soluble resin is a styrene-(meth)acrylic acid-based, water-soluble resin. The amount of the water-soluble resin added is not less than 0.4 part by weight, preferably 0.4 to 1.5 parts by weight, more preferably 0.5 to 1.2 parts by weight, in terms of solid content based on the colorant. At the outset, the yellow ink composition according to the present invention has excellent lightfastness. As described above, it has been pointed out that C.I. Pigment Yellow 74 has poor lightfastness. The yellow ink composition according to the present invention, however, has good and improved lightfastness. Further, the yellow ink composition according to the present invention is excellent in various properties required of ink compositions, especially various properties required of ink compositions for ink jet recording, as well as in lightfastness. Specifically, the present invention provides a yellow ink composition having excellent image fixation and hue (chroma).

In the yellow ink composition according to the present invention, the styrene-(meth)acrylic acid-based, water-soluble resin substantially functions as a dispersant for C.I. Pigment Yellow 74 as the colorant. As described below, the colorant is preferably added as a pigment dispersion to the ink composition. The styrene-(meth)acrylic acid-based, water-soluble resin may be added as a dispersant for the pigment dispersion to the ink composition. On the other hand, independently of the dispersant for the pigment dispersion or additionally, the styrene-(meth)acrylic acid-based, water-soluble resin may be added to the ink composition.

According to the present invention, C.I. Pigment Yellow 74 may be added in such a suitable amount that a desired image density can be realized. The amount of C.I. Pigment Yellow 74 added, however, is preferably 0.3 to 8% by weight, more preferably 2 to 4% by weight, based on the ink composition.

According to a preferred embodiment of the present invention, C.I. Pigment Yellow 74 is added, to the ink, as a pigment dispersion prepared by dispersing this pigment in an aqueous medium with the aid of a dispersant or a surfactant. The average diameter of fines particles of the pigment is preferably not more than 200 nm, more preferably not more than 120 nm.

The styrene-(meth)acrylic acid-based, water-soluble resin used in the present invention may be of random polymer or block polymer. The molecular weight thereof is preferably about 3,000 to 30,000, more preferably about 5,000 to 15,000. The ratio of the segment derived from the styrene monomer to the segment derived from the (meth)acrylic acid may be determined using an acid value as an index. Thus, according to a preferred embodiment of the present invention, the acid value of this resin is preferably about 50 to 200, more preferably about 70 to 150.

Preferably, the ink composition according to the present invention contains an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink composition.

According to a preferred embodiment of the present invention, the ink composition used in the present invention further comprises a high-boiling organic solvent. Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the low-boiling organic solvent added is preferably in the range of from 0.5 to 10% by weight, more preferably in the range of from 1.5 to 6% by weight, based on the ink composition. The amount of the high-boiling organic solvent added is preferably 0.5 to 40% by weight, more preferably 2 to 20% by weight, based the ink composition.

According to a preferred embodiment of the present invention, the ink composition according to the present invention may contain a surfactant. Preferred examples of surfactants usable herein include: anionic surfactants (for example, sodium dodecylbenzenesulfonate, sodium laurate and an ammonium salt of a polyoxyethylene alkyl ether sulfate); nonionic surfactants (for example, a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide). They may be used alone or as a mixture of two or more. Further, it is also possible to use acetylene glycol (OLFINE Y and Surfynol 82, 104, 440, 465, 485, and TG (all the above products being manufactured by Air Products and Chemicals Inc.).

According to a preferred embodiment of the present invention, the ink composition according to the present invention may contain a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is preferably about 0.1 to 40% by weight, preferably 0.5 to 30% by weight, based on the ink composition.

If necessary, pH adjustors, preservatives, antimolds and the like may be added.

[EXAMPLES]

Preparation of Pigment Ink Compositions

Pigment ink compositions comprising the following ingredients were prepared as follows. At the outset, a pigment and a dispersant resin were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed, the other additives were added, and the mixture was stirred at room temperature for 20 min. The mixture was filtered through a 5 μm membrane filter to prepare an ink composition.

Example 1

| | |
|---|---|
| C.I. Pigment Yellow 74 (particle diameter 110 nm) | 3 wt % |
| Styrene/acrylic acid copolymer, (molecular weight 7000, acid value 80) | 1.5 wt % (solid content) |
| Sucrose | 0.7 wt % |
| Maltitol | 6.3 wt % |
| Glycerin | 10 wt % |
| 2-Pyrrolidone | 2 wt % |
| Ethanol | 4 wt % |
| Pure water | Balance |

Example 2

| | |
|---|---|
| C.I. Pigment Yellow 74 (particle diameter 80 nm) | 3 wt % |
| Styrene/acrylic acid copolymer, (molecular weight 7000, acid value 120) | 2 wt % (solid content) |
| Sucrose | 0.7 wt % |
| Maltitol | 6.3 wt % |
| Glycerin | 10 wt % |
| Triethylene glycol monobutyl ether | 5 wt % |
| Surfynol 465 | 1 wt % |
| Pure water | Balance |

Example 3

| | |
|---|---|
| C.I. Pigment Yellow 74 (particle diameter 100 nm) | 3 wt % |
| Styrene/acrylic acid copolymer, (molecular weight 7000, acid value 130) | 1.3 wt % (solid content) |
| Sucrose | 0.7 wt % |
| Maltitol | 6.3 wt % |
| Glycerin | 10 wt % |
| Diethylene glycol | 3 wt % |
| Surfynol 465 | 1 wt % |
| Pure water | Balance |

Comparative Example 1

| | |
|---|---|
| C.I. Pigment Yellow 74 (particle diameter 140 nm) | 3 wt % |
| Styrene/acrylic acid copolymer, (molecular weight 7000, acid value 80) | 0.8 wt % (solid content) |
| Sucrose | 0.7 wt % |
| Maltitol | 6.3 wt % |
| Glycerin | 10 wt % |
| Diethylene glycol | 3 wt % |
| Surfynol 465 | 1 wt % |
| Pure water | Balance |

Comparative Example 2

| | |
|---|---|
| C.I. Pigment Yellow 74 (particle diameter 120 nm) | 3 wt % |
| Acrylic acid copolymer, (molecular weight 10000, acid value 200) | 1.5 wt % (solid content) |
| Sucrose | 0.7 wt % |
| Maltitol | 6.3 wt % |
| Glycerin | 7 wt % |
| Diethylene glycol monobutyl ether | 3 wt % |

-continued

| | |
|---|---|
| Diethylene glycol | 3 wt % |
| Surfynol 465 | 1 wt % |
| Pure water | Balance |
| Comparative Example 3 | |
| | |
| C.I. Pigment Yellow 138 (particle diameter 60 nm) | 3 wt % |
| Styrene-acrylic acid copolymer, (molecular weight 7000, acid value 140) | 1.5 wt % (solid content) |
| Sucrose | 0.7 wt % |
| Maltitol | 6.3 wt % |
| Glycerin | 10 wt % |
| Diethylene glycol | 3 wt % |
| Surfynol 465 | 1 wt % |
| Pure water | Balance |
| Comparative Example 4 | |
| | |
| C.I. Pigment Yellow 13 (particle diameter 100 nm) | 3 wt % |
| Styrene/acrylic acid copolymer, (molecular weight 7000, acid value 100) | 1.5 wt % (solid content) |
| Sucrose | 0.7 wt % |
| Maltitol | 6.3 wt % |
| Glycerin | 10 wt % |
| 2-Pyrrolidone | 2 wt % |
| Ethanol | 4 wt % |
| Pure water | Balance |

Evaluation Test on Ink Compositions

Prints obtained by printing the ink composition by means of an ink jet printer MJ-930C manufactured by Seiko Epson Corp. were evaluated. The printing was carried out at a density of 360 dpi×360 dpi with the weight of the ink ejected per dot being 0.040 μg.

Evaluation 1: Lightfastness

A blotted image was printed on a specialty printing medium for ink jet recording (a specialty gloss film, manufactured by Seiko Epson Corp.).

The print was irradiated with light for 500 hr by means of a xenon fadeometer. In this case, the color of the print before exposure and the color of the print after exposure were measured with a Macbeth CE-7000 spectrophotometer (manufactured by Macbeth) and expressed in terms of the L*a*b* color system of the color difference indication method specified in CIE (Commission International de l'Eclairage), and a color difference ΔE*ab between the initial color of the printed image and the color of the printed image after the light irradiation was determined from the measured L*a*b* values by the following equation. The lightfastness was evaluated in terms of the change in hue according to the following criteria.

Color difference:

$$\Delta E^*ab = [(\Delta L^*)^2 + (\Delta a^*)^2 + (\Delta b^*)^2]^{1/2}$$

Evaluation criteria:
A: ΔE*ab ≦ 10
B: ΔE*ab > 10
The results were as summarized in the following table.

Evaluation 2: Fixation

Blotted images and characters were printed on a specialty printing medium for ink jet recording as used in Evaluation 1. The print was rubbed with a finger in an environment of temperature 25° C. and humidity 50% and then visually inspected for smearing of the print and separation of the colorant. The results were evaluated according to the following criteria.

A: Neither smearing of the print nor separation of the colorant occurred.

B: Slight smearing of the print occurred with the colorant not separated.

C: Both smearing of the print and separation of the colorant occurred.

The results were as summarized in the following table.

Evaluation 3: Hue

A blotted image was printed on a specialty recording medium for ink jet recording (a specialty gloss film, manufactured by Seiko Epson Corp.). The color was measured with a Macbeth CE-7000 spectrophotometer (manufactured by Macbeth) to determine the coordinates of L*a*b* color system of the color difference indication method specified in CIE (Commission International de l'Eclairage). The chroma of the printed image defined by the following equation was determined from the measured a*b* values, and the results were evaluated according to the following criteria.

Chroma:

$$C^* = [(a^*)^2 + (b^*)^2]^{1/2}$$

Evaluation Criteria:
A: C* ≧ 95
B: 90 ≦ C* < 95
C: C* < 90

The results were as summarized in the following table.

TABLE 1

| | Evaluation 1 | Evaluation 2 | Evaluation 3 |
|---|---|---|---|
| Example 1 | A | A | A |
| Example 2 | A | A | A |
| Example 3 | A | A | A |
| Comparative Example 1 | B | B | B |
| Comparative Example 2 | B | C | B |
| Comparative Example 3 | B | A | C |
| Comparative Example 4 | B | A | B |

What is claimed is:

1. A yellow ink composition comprising: C.I. Pigment Yellow 74 as a colorant; and a styrene-(meth)acrylic acid-based, water-soluble resin, the content of the resin being not less than 0.4 part by weight in terms of solid content based on the colorant.

2. The yellow ink composition according to claim 1, wherein the styrene-(meth)acrylic acid-based, water-soluble resin has an acid value of 50 to 200.

3. The yellow ink composition according to claim 1, wherein the content of the colorant is 0.3 to 8% by weight.

4. The yellow ink composition according to claim 1, wherein the pigment has an average particle diameter of not more than 200 nm.

5. An ink jet recording method comprising the steps of: ejecting droplets of an ink composition; and depositing the droplets onto a recording medium to conduct printing on the recording medium, wherein the ink composition is one according to any one of claims 1 to 4.

6. The yellow ink composition according to claim 1, which is used for ink jet recording.

7. A recording method comprising the step of depositing an ink composition onto a recording medium to conduct printing on the recording medium, wherein the ink composition is one according to claim 1.

8. A recorded medium printed by the recording method according to claim 7.

9. The yellow ink composition according to claim 1, which comprises water and an orgnaic solvent.

10. The yellow ink composition according to claim 9, wherein the organic solvent is a monohydric alcohol.

11. The yellow ink composition according to claim 9, wherein the organic solvent is a polyhydric alcohol or an alkyl ether of polyhydric alcohol.

12. The yellow ink compositin according to claim 9, which comprises a surfactant.

13. The yellow ink composition according to claim 9, which comprises a saccharide.

* * * * *